Aug. 23, 1966  R. W. REICH  3,268,786
ELECTRIC RAZOR

Filed April 27, 1961  2 Sheets-Sheet 1

INVENTOR:
Robert Walter REICH

Aug. 23, 1966  R. W. REICH  3,268,786
ELECTRIC RAZOR
Filed April 27, 1961  2 Sheets-Sheet 2
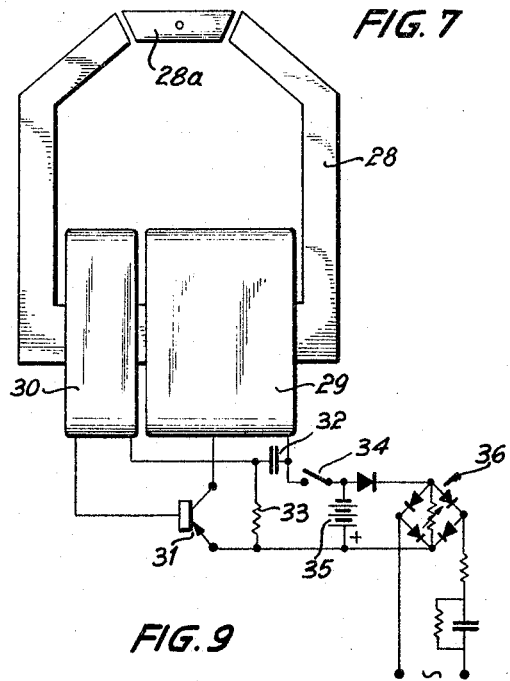
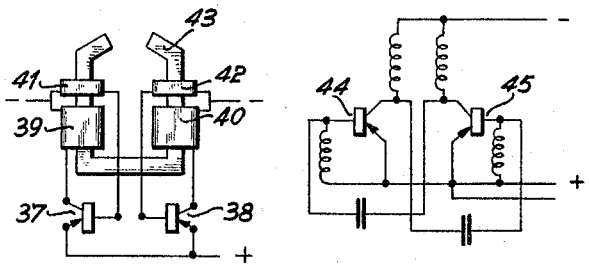
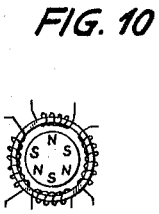
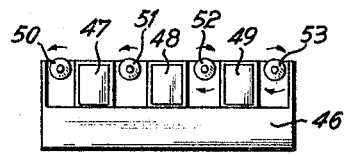
INVENTOR:
Robert Walter REICH United States Patent Office 3,268,786
Patented August 23, 1966

3,268,786
ELECTRIC RAZOR
Robert Walter Reich, 2 Rotackerstrasse, Freiburg im Breisgau, Germany
Filed Apr. 27, 1961, Ser. No. 106,129
4 Claims. (Cl. 318—128)

The present invention relates to an electric razor, more particularly, to a self-contained battery-operated electric razor wherein the battery is automatically recharged when the razor is mounted on a rack with a structure being provided to limit the charge on the battery so that the battery does not become overcharged.

Many different types of dry-shaving electric ragors have already been devised. In general, these razors comprise a cutting member which is driven by a synchronous motor or by an oscillating armature or a rotating cutting head which is directly driven by a small motor. Evidence has indicated that the reciprocating or cutting movement of the cutting blades is more advantageous than a rotating cutting head. The razors having rotary cutting heads have the disadvantage that structure cannot be provided on the cutting head for flattening and tightening the skin so that the cutting member can cut close to the surface of the skin.

One form of electric razor is a self-contained battery-operated razor which can be utilized even when no power supply is available. However, all such razors have a motor drive since the batteries will supply only direct current. It has been found, however, that the quality of the shave obtained from such razors is not satisfactory. It is therefore apparent that a satisfactory and advantageous electric razor will be obtained by constructing a razor which has reciprocating cutting blades and the razor is energized by current from batteries.

It is therefore the principal object of this invention to provide a novel and improved battery-operated electric razor.

It is another object of this invention to provide a novel and improved structure for recharging the batteries of a self-contained battery-operated electric razor.

The electric razor of the present invention essentially comprises a first casing which has a cutting head, an electric motor for powering the cutting head and batteries for energizing the motor. This casing is adapted to be supported on a mounting rack having a second casing which second casing forms an extension of the first casing when the electric razor is in position on the rack. The operating circuit is housed in the second casing and a connection is made through plugs or contacts to continuously recharge the batteries in the first casing when the razor is mounted on the rack.

It has previously been desired that the recharging circuit automatically fully charge the batteries and then the charging operation should cease. Thus, an overcharging of the batteries would be impossible. The service life of such batteries is practically unlimited if the appropriate charging current is supplied to them.

In the present invention the razor is automatically charged whenever it is mounted on its rack. A suitable charging circuit is provided which fully charges the batteries and then the current supplied is greatly decreased so that sufficient current is supplied only to maintain the charge on the batteries. This arrangement is very convenient since it is unnecessary for the user to concern himself with charging times and procedures and accordingly the razor will have a longer life since it is virtually impossible to damage the razor by improper charging procedures.

It is recognized that the purpose of use of electric razors greatly varies. For example, a razor is generally used once a day or as during a trip the razor may be used several times before it can be recharged. In certain types of batteries a premature charging would damage the battery cells. These cells are vacuum-tight and contain only a small quantity of surplus humidity. If the charging process is continued until the humidity has evaporated, the cells will become inoperative since the chemical processes of the discharge of the battery can take place only through the electrolyte for which humidity is required. For this reason also it is desirable to automatically limit the recharging process so that the battery cells cannot be damaged even when the razors are used by persons who have little or no technical background.

Even if the electric razor of this invention is connected with the supply line for a prolonged period of time, there will be no damage done to either the cells, the switching elements or to the razor as a whole. Even the smallest types of batteries may continuously remain connected to the supply line without any risk of damage because the charging circuit of this invention is so constructed that after the batteries have been operated only sufficient current to maintain the charge will flow.

With respect to another feature of this invention it is pointed out that transistor-controlled oscillating armature motors have previously been known. The present invention makes possible the use of transistor-controlled oscillating armature motors in electric razors comprising a self-contained battery and charging and recharging circuits.

Other objects and advantages of this invention will be apparent upon reference to the accompanying description when taken in conjunction with the following drawings, wherein:

FIGURE 7 is a schematic diagram of a transistor-controlled circuit for an oscillating armature motor as used in the present invention;

FIGURE 8 is an electrical diagram of a push-pull transistor circuit for driving the motor illustrated in FIGURE 7;

FIGURE 9 is an electrical diagram of a multi-vibrator circuit which can be used for driving the motor illustrated in FIGURE 7;

FIGURE 10 is an electrical diagram of a synchronous motor which can be used for powering the cutting head of the electric razor; and FIGURE 11 is a side elevational view of the cutting head showing the positions of the cutting elements and the cylindrical rollers for depressing and stretching the skin.

A specific embodiment and several modifications of the present invention will be described upon reference to the accompanying drawings wherein like reference symbols indicate the same parts throughout the various views.

Figure 1:
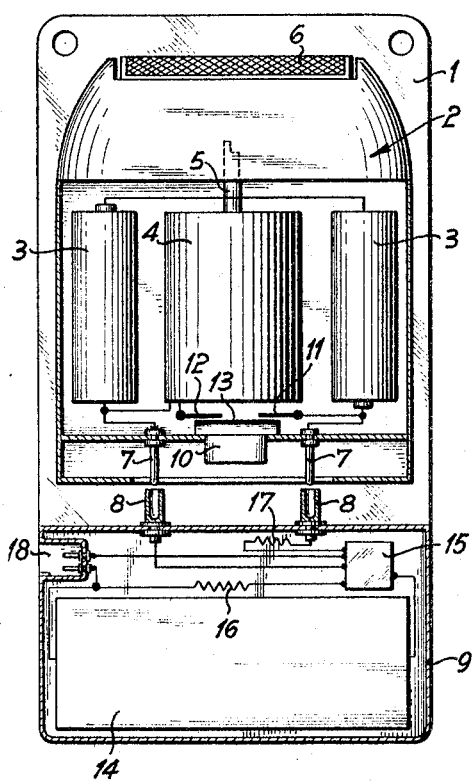
FIGURE 1 is a plan view of the electric razor of this invention showing the razor as mounted on its rack.

Returning to FIGURE 1 there is illustrated a mounting rack or holder 1 upon which the electric razor 2 of this invention is mounted. The rack 1 can either be supported from a vertical wall or on a horizontal surface such as a table.

The electric razor comprises batteries 3, and an oscillating electric motor 4 having a driving shaft 5 which is connected to a cutting head 6 of the razor. The batteries 3 and the motor 4 are connected in a suitable electrical circuit together with prongs 7 which are adapted to be inserted in sockets 8 which are mounted in the second casing 9 which houses the recharging circuit.

Figure 2:
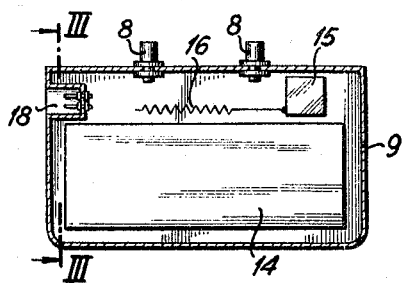
FIGURE 2 is a plan view of the interior of the casing which houses the recharging circuit.
Figure 3:
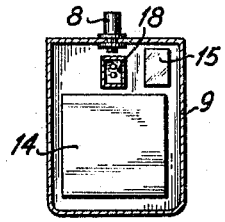
FIGURE 3 is a sectional view, taken along the line III—III in FIGURE 2.

A circuit opening and closing finger operated switch contact 10 is provided which cooperates with contacts 11, 12 and 13 to complete the circuit through the batteries and motor. The casing 9 contains a condenser 14 and a rectifier 15 and electrical resistances 16 and 17 for limiting the current in the recharging circuit. There is a plug 18 which can be connected through a suitable cord to a source of electrical energy to energize the charging circuit. The casing 9 completely encloses the components therein as may be seen in FIGURES 2 and 3 and is so constructed as to form an extension of the razor 2 when the razor is mounted on the rack 1.

Figure 4:
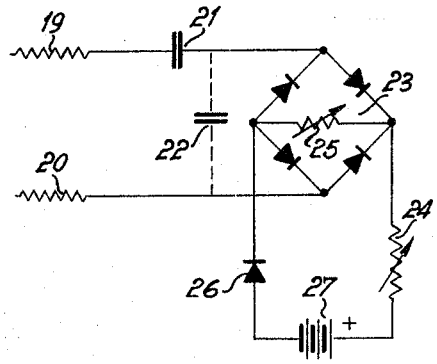
FIGURE 4 is a schematic diagram of an electrical circuit used for charging the batteries in the electric razor.

Proceeding next to FIGURE 4 there is illustrated therein the circuit used for charging the batteries of the electric razor. This charging circuit comprises electrical resistances 19 and 20, a condenser 21 connected in series with one of the resistances and a condenser 22 connected across the two resistances. These condensers are arranged in a frequency circuit and are so selected that the maximum charge voltage required for fully charging the batteries is available behind a rectifier 23 which is positioned in front of the battery.

There is a limiting resistance 24, which may be a thermistor, positioned between the rectifier 23 and the battery and a second limiting resistance 25 which has a circuit therewith, a diode or rectifier 26, in order to avoid a back discharge, provided by way of the battery indicated at 27.

The resistances 24 and 25 are characterized by the variation of the electrical resistance thereof as a function of the temperature and this resistance is so dimensioned that the maximum charge voltage is reduced to the voltage necessary for maintaining the charge when the batteries are fully charged. When the voltage of the batteries increases as a result of the recharging process, the charging current is reduced and this, in turn, increases the resistance of the semiconductor resistance. This resistance is increased as a function of temperature and limits the current flowing therethrough to the intensity of the current necessary for maintaining the charge on the battery. The voltage which is continuously supplied to the batteries for maintaining the charge is approximately $\frac{1}{300}$ of the capacity of the batteries. This is an extremely low current and accordingly the continuous recharging of the electric razor is relatively inexpensive. As a result, any of the charge of the battery which is used is always replaced and the batteries are continuously maintained in a fully charged condition in such a manner that no damage of the batteries is possible by overcharging thereof.

Even in the event extremely delicate batteries are used a fully automatic and continuous recharging of these batteries is possible without the user of the razor giving any particular attention to this charging procedure and without any risk of damage to the batteries.

Figure 5:
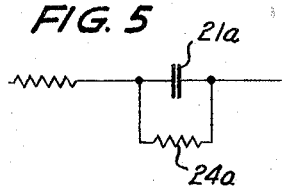
FIGURES 5 and 6 are electrical circuit diagrams showing other arrangements of the electrical resistances in the circuit of FIGURE 4.
Figure 6:
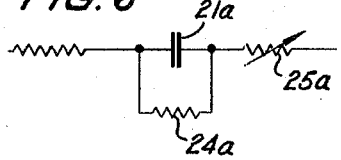

Proceeding next to FIGURE 5 there is illustrated another connection which could be employed with a limiting resistance in the circuit of FIGURE 4. In this alternative arrangement the temperature sensitive resistance 24a shunt the condenser 21a in the alternating current circuit so that the combined electrical resistance is dependent upon the required charging current. This arrangement has the advantage that upon opening of the circuit the condenser can be simultaneously discharged through the resistance and thus provide additional protection against current surges resulting from the discharge of the condenser. See FIGURE 6, in addition to shunting resistance 24a, a series temperature sensitive resistance 25a is also employed.

Proceeding next to FIGURE 7 there is illustrated a transistor-controlled circuit for driving an oscillating armature motor which can also be used to reciprocate the cutting elements of the electrical razor of this invention. This motor corresponds to motor 4 of FIGURE 1.

The oscillating armature motor essentially comprises a core 28 upon which is mounted a tuning winding 29 and a feed-back winding 30. The tuning winding is connected in the emitter collector circuit of a transistor 31 and the feed-back winding 30 is connected in the base emitter circuit of this transistor. The base is connected to the feed-back circuit through a properly dimensioned condenser 32 and a resistance 33 to provide the initial potential. This provides an oscillating circuit which oscillates at a frequency corresponding to the electric circuit constants and accordingly energizes the magnetic core of the oscillating armature. The oscillator circuit is connected through a switch 34 to a battery 35 and a charging circuit generally indicated at 36. This charging circuit is similar to that described in FIGURES 4 through 6. The armature 28a of core 28 is normally disposed in position to provide greater reluctance in core 28 and will move to a position of lesser reluctance in core 28 and will, thus vibrate when the circuit oscillates. A mechanical connection leads from armature 28a to the cutter element (not shown).

Proceeding next to FIGURE 8 there is shown a push-pull transistor circuit for energizing the oscillating armature motor of this electric razor. This circuit comprises a pair of transistors 37 and 38, a corresponding pair of tuning windings 39 and 40 and a corresponding pair of feed-back windings 41 and 42. These windings are positioned on a magnetic core 43 in a manner similar to that described in the circuit of FIGURE 7.

In FIGURE 9 there is shown a multivibrator circuit with transistors which can be used either for energizing an oscillating armature motor previously described or for driving a synchronous motor as illustrated in FIGURE 10. This synchronous motor is generally known and hence need not be described further. The multivibrator circuit comprises a pair of transistors 44 and 45 which are connected in the usual manner of a multivibrator circuit and the coils in the circuit form the energizing coils of the motor of FIG. 10.

While this multivibrator circuit can be used, it appears to be more advantageous to position the driving coils on the magnetic core since this requires relatively few elements to transform direct current into an alternating current of a corresponding frequency. The effective power of the circuit is high and the load on the battery is small since the sole use of electrical energy is in energizing the oscillating armature and requires a relatively small amount of energy.

The oscillating armature drive for the cutting elements of the cutting head can be constructed in the conventional manner. Accordingly, the cutting blades would reciprocate in order to accomplish the cutting action. In FIGURE 11 there is shown an elevational view of the cutting head which is indicated at 46 and which comprises a plurality of reciprocating cutting elements 47, 48 and 49. A plurality of cylinders connected at 50, 51, 52 and 53 are mounted between the cutting elements. These cylinders are resiliently mounted for rotary movement. It is preferable that these cylinders be mounted for rotary movement in opposite directions, as indicated by the directional arrows in FIGURE 11. This opposite rotation will cause stretching of the skin and thus facilitate close cutting of the hair growing out of this stretched skin.

The use of transistors results in both decreasing the size of the electric razor and the cost of manufacture thereof, so that the razor can easily be mass-produced at economical prices. Since no electrical supply line is necessary for operating the electric razor, the razor can be used independently of sources of electrical energy and thus is not dependent upon the availability of electrical outlets. The voltage in the razor is low so as not to present any danger whatsoever to the user of the razor.

Thus it can be seen that the present invention has provided a self-contained battery-operated electric razor whose batteries can be maintained at a full charge continuously without resulting in any damage to the batteries or the razor.

It will be understood that this invention is susceptible to modification in order to adapt it to different usages and conditions and, accordingly, it is desired to comprehend such modifications within this invention as may fall within the scope of the appended claims.

What I claim is:

1. An electric razor comprising a first casing having a cutting head, an oscillating armature motor in said first casing drivingly connected to said cutting head and having an iron core, a transistor circuit in said first casing, a tuning winding on said core connected to one of the emitter and collector circuits of the transistor of said circuit, a feed-back winding on said core connected to the base circuit of said transistor, battery means in said first casing for energizing said transistor circuit to drive said oscillating armature motor and normally disconnected from the transistor circuit, a holder for said first casing and comprising a second casing which forms an extension of said first casing when said first casing is positioned on said holder, a rectifier in said second casing for recharging said battery means, resistor means for limiting the current supplied to said battery, during recharging thereof, means operable in response to placing of said first casing on said holder for electrically connecting said recharging rectifier to said battery means in said first casing for recharging the same and switch means in said first casing operable only when said casings are separated for connecting the battery means to said transistor circuit.

2. An electric razor comprising a first casing having a cutting head, an oscillating armature motor in said first casing drivingly connected to said cutting head and having an iron core, a push-pull transistor circuit in said first casing for driving said oscillating armature motor and including two transistors, two feed-back coils and two tuning coils mounted on said core, battery means in said first casing for energizing said push-pull transistor circuit to drive said oscillating armature motor and normally disconnected from said transistor circuit, a holder for said first casing and comprising a second casing to form an extension of said first casing when the first casing is positioned on said holder, means in said second casing for recharging said battery, means for limiting current supplied to said battery means during recharging, means operable upon placing said first casing on said holder for electrically connecting said recharging means to said battery means in said first casing for recharging the same, and switch means in said first casing accessible only when said first casing is removed from said holder for connecting said battery means to said transistor circuit.

3. An electric razor comprising a first casing having a cutting head, an oscillating armature motor in said first casing drivingly connected to said head, a multivibrator circuit in said first casing for oscillating said armature motor, battery means in said first casing for energizing said multivibrator circuit to drive said oscillating motor and normally disconnected from said circuit, a holder for said first casing and comprising a second casing which forms an extension of said first casing when said first casing is positioned on said holder, means in said second casing for recharging said battery, means for limiting the current supplied to said battery means during recharging, means responsive to the placing of said first casing on said holder for electrically connecting said recharging means to said battery means in said first casing, and switch means in said first casing accessible only when said first casing is removed from said holder for connecting said battery means to said transistor circuit.

4. An electric razor comprising a first casing having a cutting head, an electric motor in said first casing for driving said cutting head and having energization windings, a transistor feedback oscillator in said first casing electrically connected to said motor, whereby said energization windings of said motor constitute an inductive feedback loop of said oscillator, a battery in said first casing for energizing said oscillator, a holder for said first casing and comprising a second casing which forms an extension of said first casing when said first casing is positioned on said holder, a rectifier in said second casing for recharging said battery, electrical resistance means in circuit with said rectifier to limit the flow of current therefrom to said battery, said electrical resistance means including an element the electrical resistance of which decreases with increasing temperature thereof, means operable in response to the positioning of said first casing on said holders for electrically connecting said rectifier of said second casing to said battery in said first casing for recharging the battery, and switch means in said first casing accessible only when said first casing is removed from said holder for connecting said battery means to said transistor circuit.

References Cited by the Examiner

UNITED STATES PATENTS

| | | | |
|---|---|---|---|
| 1,981,787 | 11/1934 | Florman | 30—43 |
| 2,119,248 | 5/1938 | Segal | 30—34 |
| 2,356,269 | 8/1944 | Potter | 323—99.5 |
| 2,769,946 | 11/1956 | Brailsford | 318—128 |
| 2,880,503 | 4/1959 | Carissimi | 30—34 |
| 2,895,095 | 7/1959 | Guyton | 318—127 |
| 2,952,907 | 9/1960 | Miller | 30—34 |
| 3,010,075 | 11/1961 | Epperlein | 318—129 X |
| 3,025,455 | 3/1962 | Jonsson | 320—35 X |

FOREIGN PATENTS

| | | |
|---|---|---|
| 871,604 | 1/1942 | France. |
| 1,211,860 | 10/1959 | France. |
| 1,226,681 | 2/1960 | France. |

OTHER REFERENCES

A.P.C. application of Zdansky, Serial No. 427,480, published June 15, 1942 (abandoned).

JOHN F. COUCH, *Primary Examiner.*

EDWARD V. BENHAM, LLOYD McCOLLUM,
*Examiners.*

M. C. KRAUSE, S. WEINBERG, *Assistant Examiners.*